(12) United States Patent
Gargash

(10) Patent No.: US 8,370,665 B2
(45) Date of Patent: Feb. 5, 2013

(54) SYSTEM AND METHOD OF SAMPLING DATA WITHIN A CENTRAL PROCESSING UNIT

(75) Inventor: Norman S. Gargash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 12/846,119

(22) Filed: Jul. 29, 2010

(65) Prior Publication Data

US 2011/0173471 A1 Jul. 14, 2011

Related U.S. Application Data

(60) Provisional application No. 61/294,028, filed on Jan. 11, 2010.

(51) Int. Cl.
*G06F 1/00* (2006.01)
*G06F 1/26* (2006.01)
*G06F 1/32* (2006.01)

(52) U.S. Cl. .................. 713/323; 713/320; 713/322

(58) Field of Classification Search .......... 713/320, 713/322, 323
See application file for complete search history.

(56) References Cited

U.S. PATENT DOCUMENTS

| | | | | |
|---|---|---|---|---|
| 5,745,375 | A * | 4/1998 | Reinhardt et al. | 700/286 |
| 6,570,853 | B1 * | 5/2003 | Johnson et al. | 370/236 |
| 7,500,124 | B2 | 3/2009 | Seo | |
| 7,711,966 | B2 | 5/2010 | Prabhakaran et al. | |
| 7,903,622 | B2 * | 3/2011 | Huang | 370/338 |
| 7,949,888 | B2 * | 5/2011 | Cox et al. | 713/323 |
| 2003/0014467 | A1 * | 1/2003 | Hanzawa | 709/102 |
| 2003/0118112 | A1 * | 6/2003 | Son et al. | 375/240.25 |
| 2004/0255176 | A1 | 12/2004 | George et al. | |
| 2005/0144492 | A1 * | 6/2005 | Yun et al. | 713/300 |
| 2005/0223249 | A1 * | 10/2005 | Samson | 713/320 |
| 2005/0278561 | A1 * | 12/2005 | Seo | 713/322 |
| 2006/0037024 | A1 | 2/2006 | Bodas | |
| 2006/0271807 | A1 | 11/2006 | Suzuki et al. | |
| 2006/0275934 | A1 * | 12/2006 | Pohl et al. | 438/14 |
| 2007/0157207 | A1 * | 7/2007 | Kim et al. | 718/103 |
| 2007/0220291 | A1 * | 9/2007 | Stufflebeam | 713/320 |
| 2008/0147357 | A1 * | 6/2008 | Truter | 702/186 |
| 2008/0271043 | A1 * | 10/2008 | Kim et al. | 718/108 |
| 2009/0049314 | A1 * | 2/2009 | Taha et al. | 713/300 |
| 2009/0132835 | A1 | 5/2009 | Ehmann | |
| 2010/0295521 | A1 * | 11/2010 | Odaohhara | 323/282 |
| 2011/0145617 | A1 * | 6/2011 | Thomson et al. | 713/323 |

(Continued)

FOREIGN PATENT DOCUMENTS

EP 0098169 A2 1/1984
JP 09073338 A * 3/1997

(Continued)

OTHER PUBLICATIONS

Mochocki, B.C.; Hu, X.S.; Gang Quan; , "A unified approach to variable voltage scheduling for nonideal DVS processors," Computer-Aided Design of Integrated Circuits and Systems, IEEE Transactions on , vol. 23, No. 9, pp. 1370-1377, Sep. 2004.*

(Continued)

*Primary Examiner* — Faisal M Zaman
(74) *Attorney, Agent, or Firm* — Nicholas A. Cole

(57) ABSTRACT

A method of sampling data within a central processing unit (CPU) is disclosed. The method may include monitoring CPU activity, determining whether the CPU enters idle, and executing a dynamic clock and voltage switching (DCVS) algorithm if the CPU enters idle.

28 Claims, 9 Drawing Sheets

U.S. PATENT DOCUMENTS

| | | | |
|---|---|---|---|
| 2011/0173463 A1* | 7/2011 | Gargash et al. | 713/300 |
| 2011/0173617 A1* | 7/2011 | Gargash et al. | 718/100 |

FOREIGN PATENT DOCUMENTS

| | | | |
|---|---|---|---|
| JP | 11143573 A * | 5/1999 | |
| JP | 2001245195 A * | 9/2001 | |
| JP | 2005190483 A * | 7/2005 | |
| JP | 2006227849 A * | 8/2006 | |
| WO | WO 9221081 A1 * | 11/1992 | |
| WO | WO 2009026361 A2 * | 2/2009 | |

OTHER PUBLICATIONS

Inki Hong; Kirovski, D.; Gang Qu; Potkonjak, M.; Srivastava, M.B.;, "Power optimization of variable voltage core-based systems," Design Automation Conference, 1998. Proceedings, pp. 176-181, Jun. 19-19, 1998.*

Li Fang-Wei; Li Han;, "Dynamic voltage and frequency scaling for power saving in TD-SCDMA," Educational and Information Technology (ICEIT), 2010 International Conference on, vol. 1, pp. V1-34-V1-37, 17-19 Sep. 17-19, 2010.*

Kihwan Choi; Soma, R.; Pedram, M.;, "Fine-grained dynamic voltage and frequency scaling for precise energy and performance trade-off based on the ratio of off-chip access to on-chip computation times," Design, Automation and Test in Europe Conference and Exhibition, 2004. Proceedings, vol. 1, pp. 4-9 vol. 1, Feb. 16-20, 2004.*

International Search Report and Written Opinion—PCT/US2011/020684-ISA/EPO—May 23, 2011.

Wonyoung Kim, Meeta S. Gupta, Gu-Yeon Wei and David Brooks, "System Level Analysis of Fast, Per-Core DVFS using On-Chip Switching Regulators." IEEE International Symposium on High-Performance Computer Architecture (HPCA), Feb. 2008.

* cited by examiner

SYSTEM AND METHOD OF SAMPLING DATA WITHIN A CENTRAL PROCESSING UNIT

RELATED APPLICATIONS

The present application claims priority to U.S. Provisional Patent Application Ser. No. 61/294,028, entitled SYSTEM AND METHOD OF SAMPLING DATA WITHIN A CENTRAL PROCESSING UNIT, filed on Jan. 11, 2010, the contents of which are fully incorporated by reference.

DESCRIPTION OF THE RELATED ART

Portable computing devices (PCDs) are ubiquitous. These devices may include cellular telephones, portable digital assistants (PDAs), portable game consoles, palmtop computers, and other portable electronic devices. In addition to the primary function of these devices, many include peripheral functions. For example, a cellular telephone may include the primary function of making cellular telephone calls and the peripheral functions of a still camera, a video camera, global positioning system (GPS) navigation, web browsing, sending and receiving emails, sending and receiving text messages, push-to-talk capabilities, etc. As the functionality of such a device increases, the processing power required to support such functionality also increases. Further, as the computing power increases, there exists a greater need to effectively manage the processor, or processors, that provide the computing power.

Accordingly, what is needed is an improved method of sampling data within a central processing unit.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
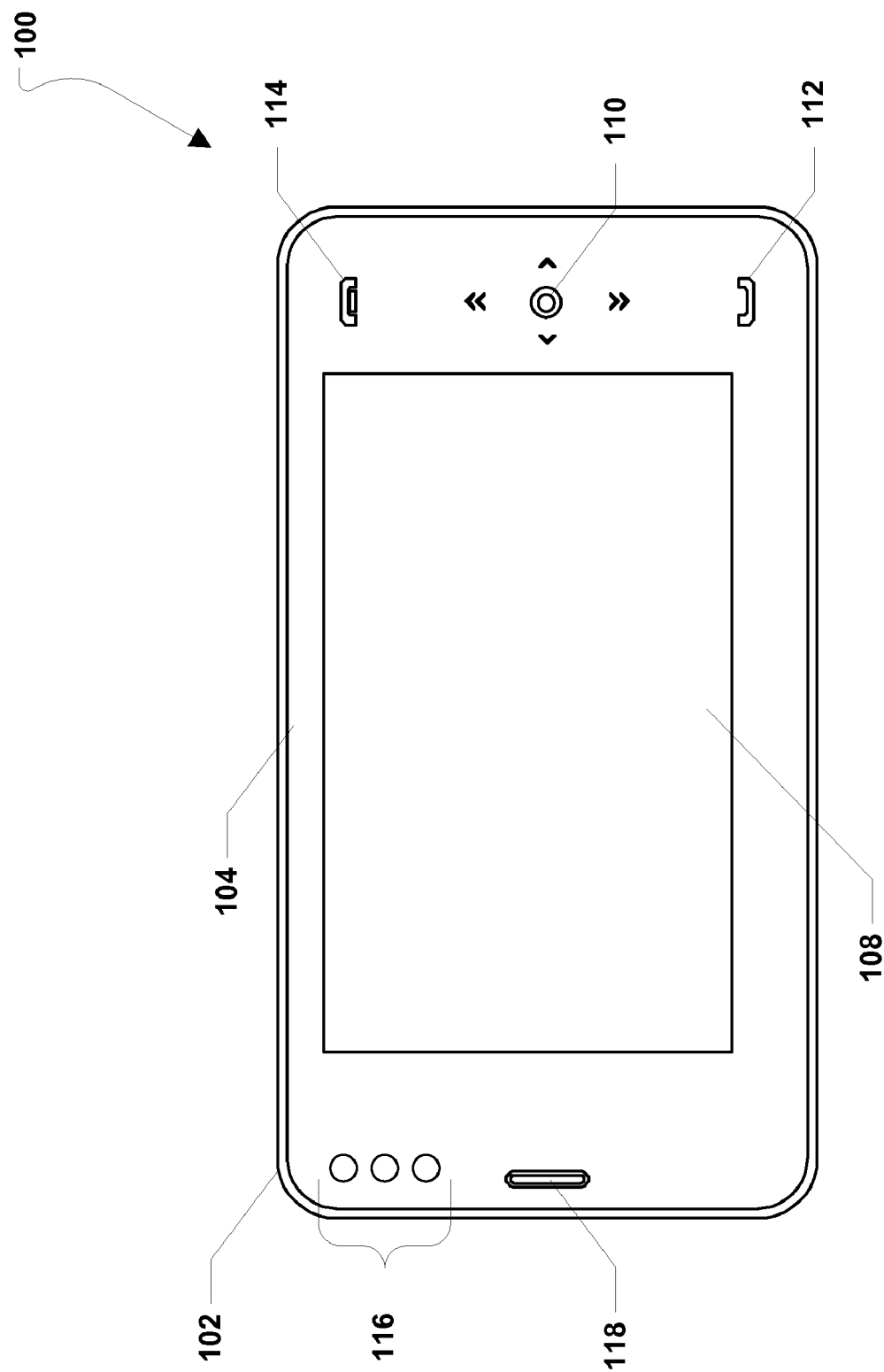
FIG. 1 is a front plan view of a first aspect of a portable computing device (PCD) in a closed position.
Figure 2:
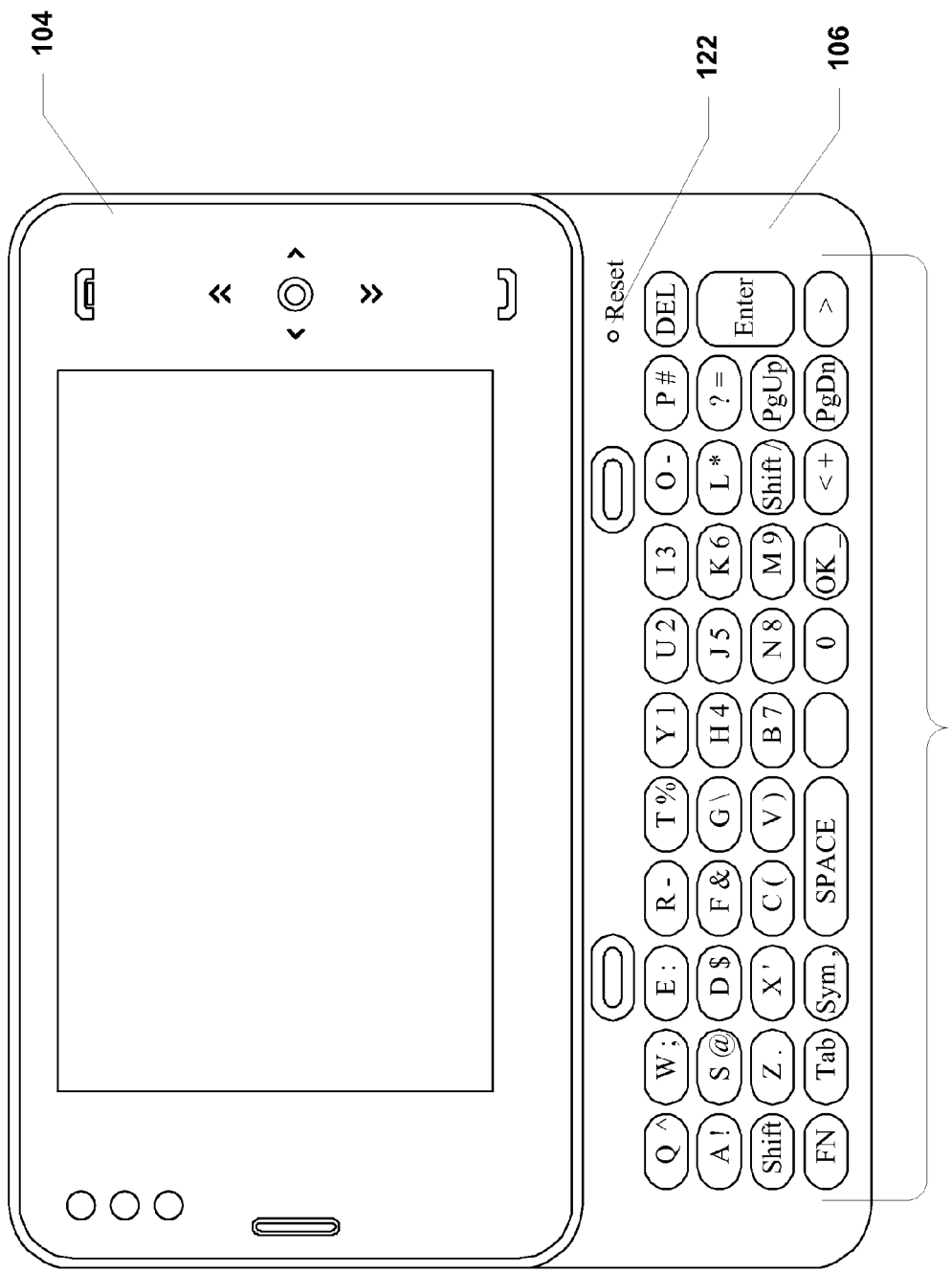
FIG. 2 is a front plan view of the first aspect of a PCD in an open position.

Referring initially to FIG. 1 and FIG. 2, an exemplary portable computing device (PCD) is shown and is generally designated 100. As shown, the PCD 100 may include a housing 102. The housing 102 may include an upper housing portion 104 and a lower housing portion 106. FIG. 1 shows that the upper housing portion 104 may include a display 108. In a particular aspect, the display 108 may be a touch screen display. The upper housing portion 104 may also include a trackball input device 110. Further, as shown in FIG. 1, the upper housing portion 104 may include a power on button 112 and a power off button 114. As shown in FIG. 1, the upper housing portion 104 of the PCD 100 may include a plurality of indicator lights 116 and a speaker 118. Each indicator light 116 may be a light emitting diode (LED).

In a particular aspect, as depicted in FIG. 2, the upper housing portion 104 is movable relative to the lower housing portion 106. Specifically, the upper housing portion 104 may be slidable relative to the lower housing portion 106. As shown in FIG. 2, the lower housing portion 106 may include a multi-button keyboard 120. In a particular aspect, the multi-button keyboard 120 may be a standard QWERTY keyboard. The multi-button keyboard 120 may be revealed when the upper housing portion 104 is moved relative to the lower housing portion 106. FIG. 2 further illustrates that the PCD 100 may include a reset button 122 on the lower housing portion 106.

Figure 3:
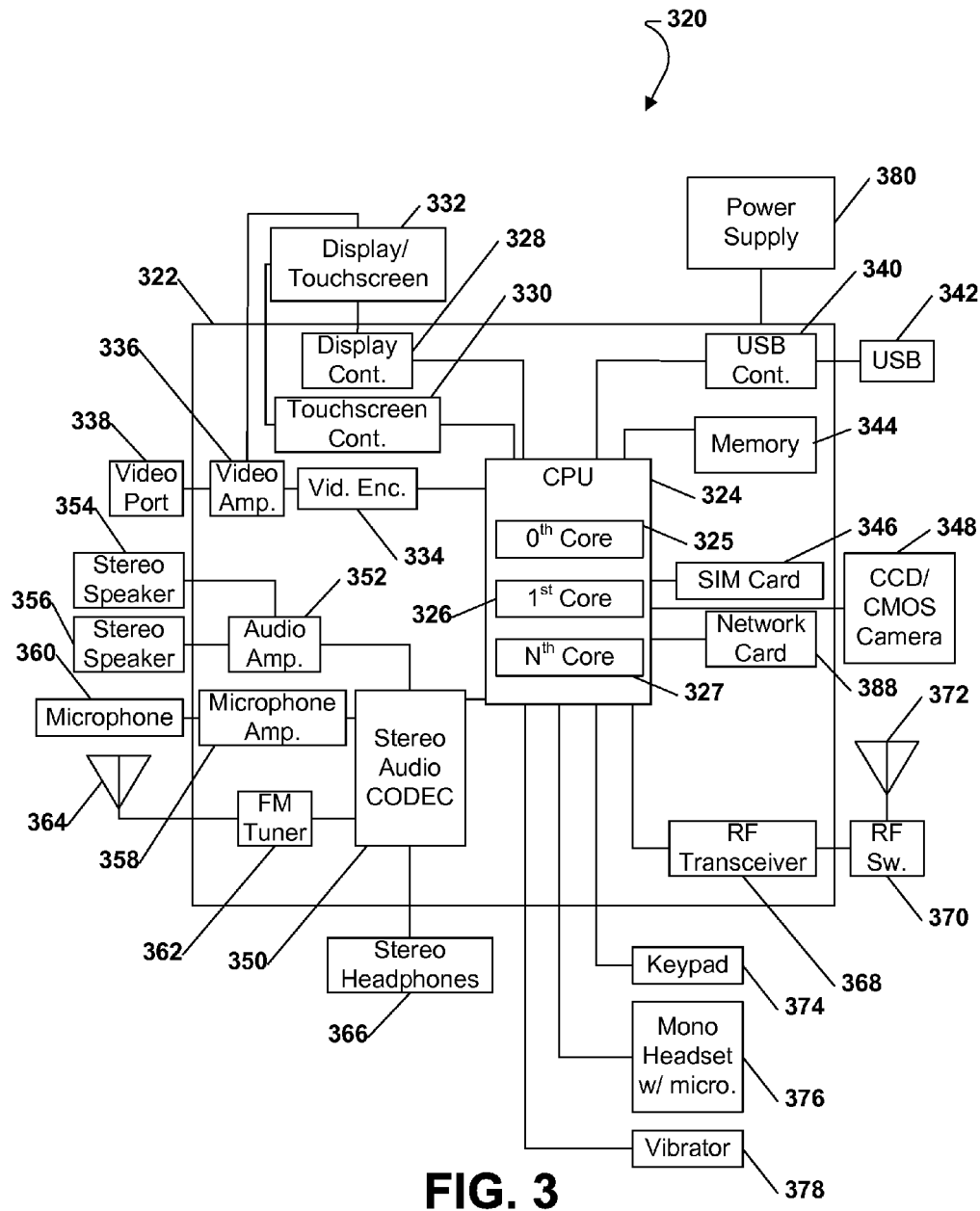
FIG. 3 is a block diagram of a second aspect of a PCD.

Referring to FIG. 3, an exemplary, non-limiting aspect of a portable computing device (PCD) is shown and is generally designated 320. As shown, the PCD 320 includes an on-chip system 322 that includes a multicore CPU 324. The multicore CPU 324 may include a zeroth core 325, a first core 326, and an Nth core 327.

As illustrated in FIG. 3, a display controller 328 and a touch screen controller 330 are coupled to the multicore CPU 324. In turn, a display/touchscreen 332 external to the on-chip system 322 is coupled to the display controller 328 and the touch screen controller 330.

FIG. 3 further indicates that a video encoder 334, e.g., a phase alternating line (PAL) encoder, a sequential couleur a memoire (SECAM) encoder, or a national television system(s) committee (NTSC) encoder, is coupled to the multicore CPU 324. Further, a video amplifier 336 is coupled to the video encoder 334 and the display/touchscreen 332. Also, a video port 338 is coupled to the video amplifier 336. As depicted in FIG. 3, a universal serial bus (USB) controller 340 is coupled to the multicore CPU 324. Also, a USB port 342 is coupled to the USB controller 340. A memory 344 and a subscriber identity module (SIM) card 346 may also be coupled to the multicore CPU 324. Further, as shown in FIG. 3, a digital camera 348 may be coupled to the multicore CPU 324. In an exemplary aspect, the digital camera 348 is a charge-coupled device (CCD) camera or a complementary metal-oxide semiconductor (CMOS) camera.

As further illustrated in FIG. 3, a stereo audio CODEC 350 may be coupled to the multicore CPU 324. Moreover, an audio amplifier 352 may coupled to the stereo audio CODEC 350. In an exemplary aspect, a first stereo speaker 354 and a second stereo speaker 356 are coupled to the audio amplifier 352. FIG. 3 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 3 further indicates that a radio frequency (RF) transceiver 368 may be coupled to the multicore CPU 324. An RF switch 370 may be coupled to the RF transceiver 368 and an RF antenna 372. As shown in FIG. 3, a keypad 374 may be coupled to the multicore CPU 324. Also, a mono headset with a microphone 376 may be coupled to the multicore CPU 324. Further, a vibrator device 378 may be coupled to the multicore CPU 324. FIG. 3 also shows that a power supply 380 may be coupled to the on-chip system 322. In a particular aspect, the power supply 380 is a direct current (DC) power supply that provides power to the various components of the PCD 320 that require power. Further, in a particular aspect, the power supply is a rechargeable DC battery or a DC power supply that is derived from an alternating current (AC) to DC transformer that is connected to an AC power source.

FIG. 3 further indicates that the PCD 320 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, or any other network card well known in the art. Further, the network card 388 may be incorporated into a chip, i.e., the network card 388 may be a full solution in a chip, and may not be a separate network card 388.

As depicted in FIG. 3, the display/touchscreen 332, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 are external to the on-chip system 322.

In a particular aspect, one or more of the method steps described herein may be stored in the memory 344 as computer program instructions. These instructions may be executed by the multicore CPU 324 in order to perform the methods described herein. Further, the multicore CPU 324, the memory 344, or a combination thereof may serve as a means for executing one or more of the method steps described herein in order to sample data within a central processing unit.

Figure 4:
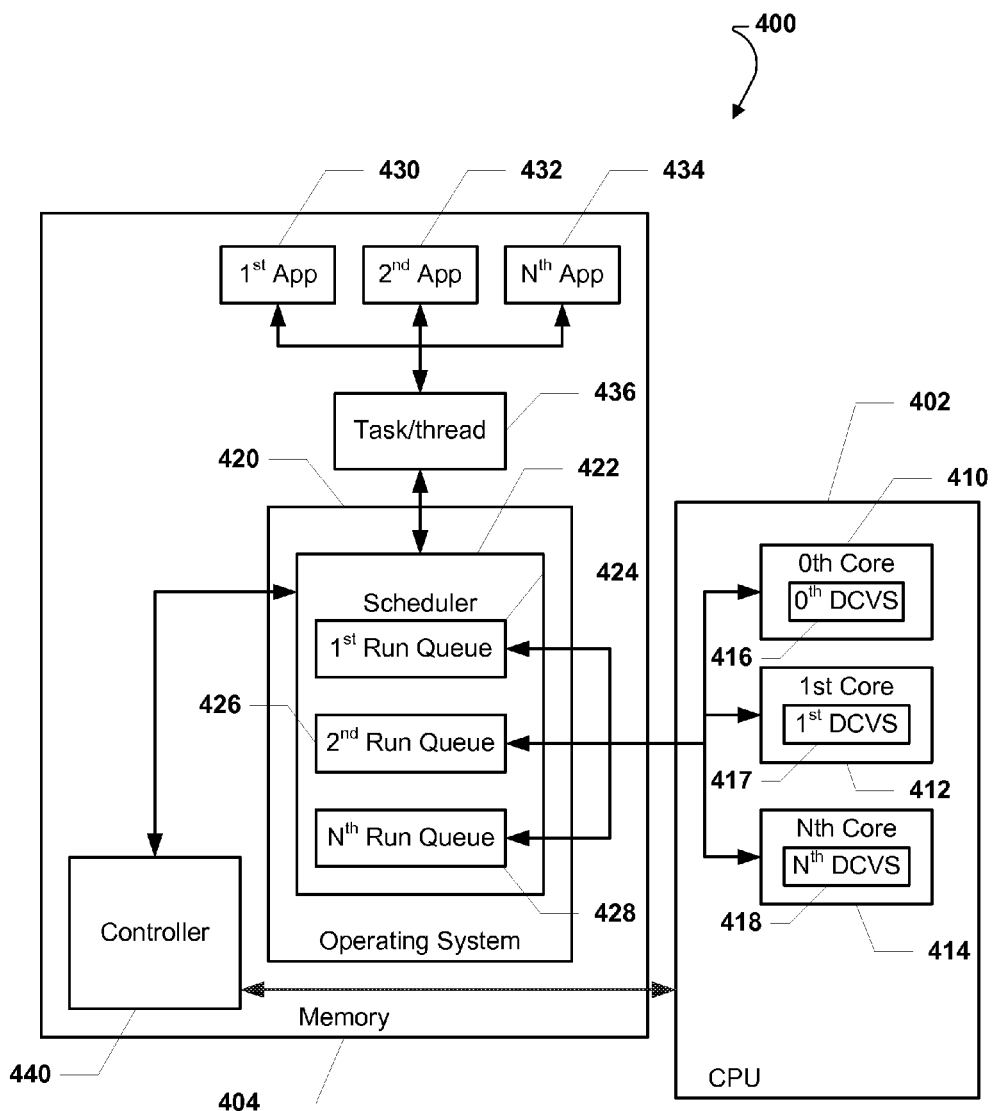
FIG. 4 is a block diagram of a processing system.

Referring to FIG. 4, a processing system is shown and is generally designated 400. In a particular aspect, the processing system 400 may be incorporated into the PCD 320 described above in conjunction with FIG. 3. As shown, the processing system 400 may include a multicore central processing unit (CPU) 402 and a memory 404 connected to the multicore CPU 402. The multicore CPU 402 may include a zeroth core 410, a first core 412, and an Nth core 414. The zeroth core 410 may include a zeroth dynamic clock and voltage scaling (DCVS) algorithm 416 executing thereon. The first core 412 may include a first DCVS algorithm 417 executing thereon. Further, the Nth core 414 may include an Nth DCVS algorithm 418 executing thereon. In a particular aspect, each DCVS algorithm 416, 417, 418 may be independently executed on a respective core 410, 412, 414.

Moreover, as illustrated, the memory 404 may include an operating system 420 stored thereon. The operating system 420 may include a scheduler 422 and the scheduler 422 may include a first run queue 424, a second run queue 426, and an Nth run queue 428. The memory 404 may also include a first application 430, a second application 432, and an Nth application 434 stored thereon.

In a particular aspect, the applications 430, 432, 434 may send one or more tasks 436 to the operating system 420 to be processed at the cores 410, 412, 414 within the multicore CPU 402. The tasks 436 may be processed, or executed, as single tasks, threads, or a combination thereof. Further, the scheduler 422 may schedule the tasks, threads, or a combination thereof for execution within the multicore CPU 402. Additionally, the scheduler 422 may place the tasks, threads, or a combination thereof in the run queues 424, 426, 428. The cores 410, 412, 414 may retrieve the tasks, threads, or a combination thereof from the run queues 424, 426, 428 as instructed, e.g., by the operating system 420 for processing, or execution, of those task and threads at the cores 410, 412, 414.

FIG. 4 also shows that the memory 404 may include a controller 440 stored thereon. The controller 440 may be connected to the operating system 420 and the multicore CPU 402. Specifically, the controller 440 may be connected to the scheduler 422 within the operating system 420. As described herein, the controller 440 may monitor the workload on the cores 410, 412, 414 and the controller 440 may sample data from the cores 410, 412, 414 as described below.

In a particular aspect, the controller 440 may be a software program. However, in an alternative aspect, the controller 440 may be a hardware controller that is external to the memory 404. In either case, the controller 440, the memory 404, the cores 410, 412, 414, or any combination thereof may serve as a means for executing one or more of the method steps described herein in order to sample data from the cores 410, 412, 414.

Figure 5:
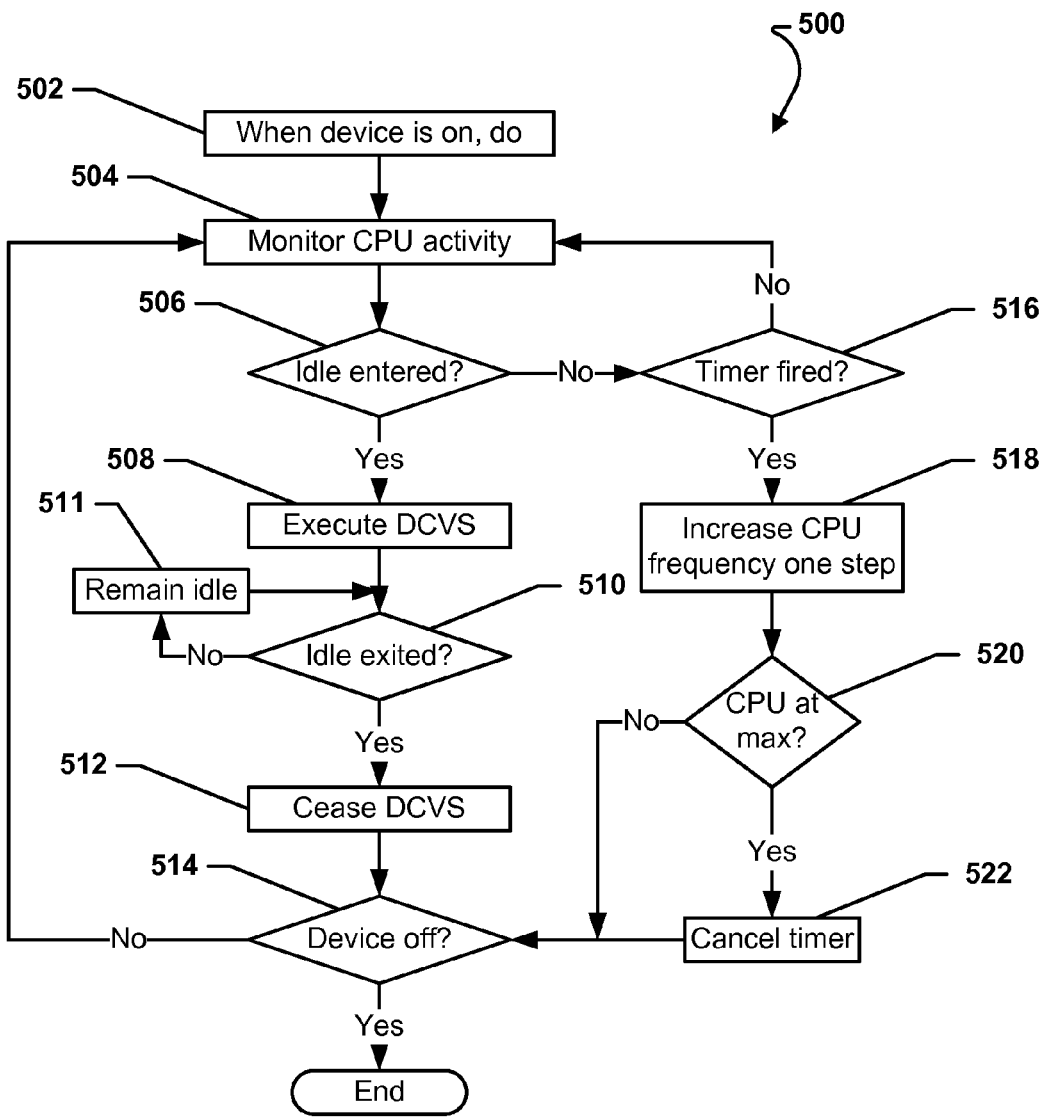
FIG. 5 is a flowchart illustrating a first aspect of a method of sampling data within a central processing unit.

Referring to FIG. 5, a method of executing a dynamic clock and voltage scaling (DCVS) algorithm is shown and is generally designated 500. The method 500 begins at block 502 with a do loop in which when a device is powered on, the following steps may be performed. At block 504, a controller may monitor CPU activity. This activity may be the activity of a single core CPU, a multi-core CPU, multiple single core CPUs, multiple multi-core CPUs, or a combination thereof. Further, the controller may be a software controller, a hardware controller, or a combination thereof.

Moving to decision 506, the controller may determine whether the CPU, or a core of the CPU, has entered an idle state. If so, the method may proceed to block 508 and the controller may execute a DCVS algorithm. Thereafter, at decision 510, the controller may determine whether the CPU, or the core of the CPU, as exited the idle state. If not, the method 500 may proceed to block 511 and the CPU may remain idle. Then, the method may return to decision 510 and the method 500 may continue as described herein. Otherwise, if the CPU, or the core of the CPU, exits the idle state, the method 500 may continue to block 512 and the controller may cease the execution of the DCVS algorithm. Thereafter, the controller may determine whether the device is powered off. If the device is powered off, the method 500 may end. Conversely, if the device remains powered on, the method 500 may return to block 504 and the method 500 may continue as described herein.

Returning to decision 506, if the CPU, or the core of the CPU, does not enter an idle state, the method 500 may proceed to decision 516. At decision 516, the controller may determine whether a timer has fired. If not, the method 500 may return to block 504 and the method 500 may continue as described herein. If the timer is fired, the method 500 may move to block 518 and the controller may increase the CPU frequency one step. Next, at decision 520, the controller may determine whether the CPU frequency is at a maximum CPU frequency. If the CPU frequency is at a maximum CPU frequency, the timer may be cancelled at block 522. Then, the method 500 may proceed to decision 514 and the method 500 may continue as described herein. If the CPU frequency is not at the maximum CPU frequency, the method 500 may move directly to decision 514 and the method 500 may continue as described herein.

In a particular aspect, execution of the DCVS algorithm may be skipped if idle is entered to substantially close to the previous idle time. This may be dependent on a desired DCVS response time.

Figure 6:
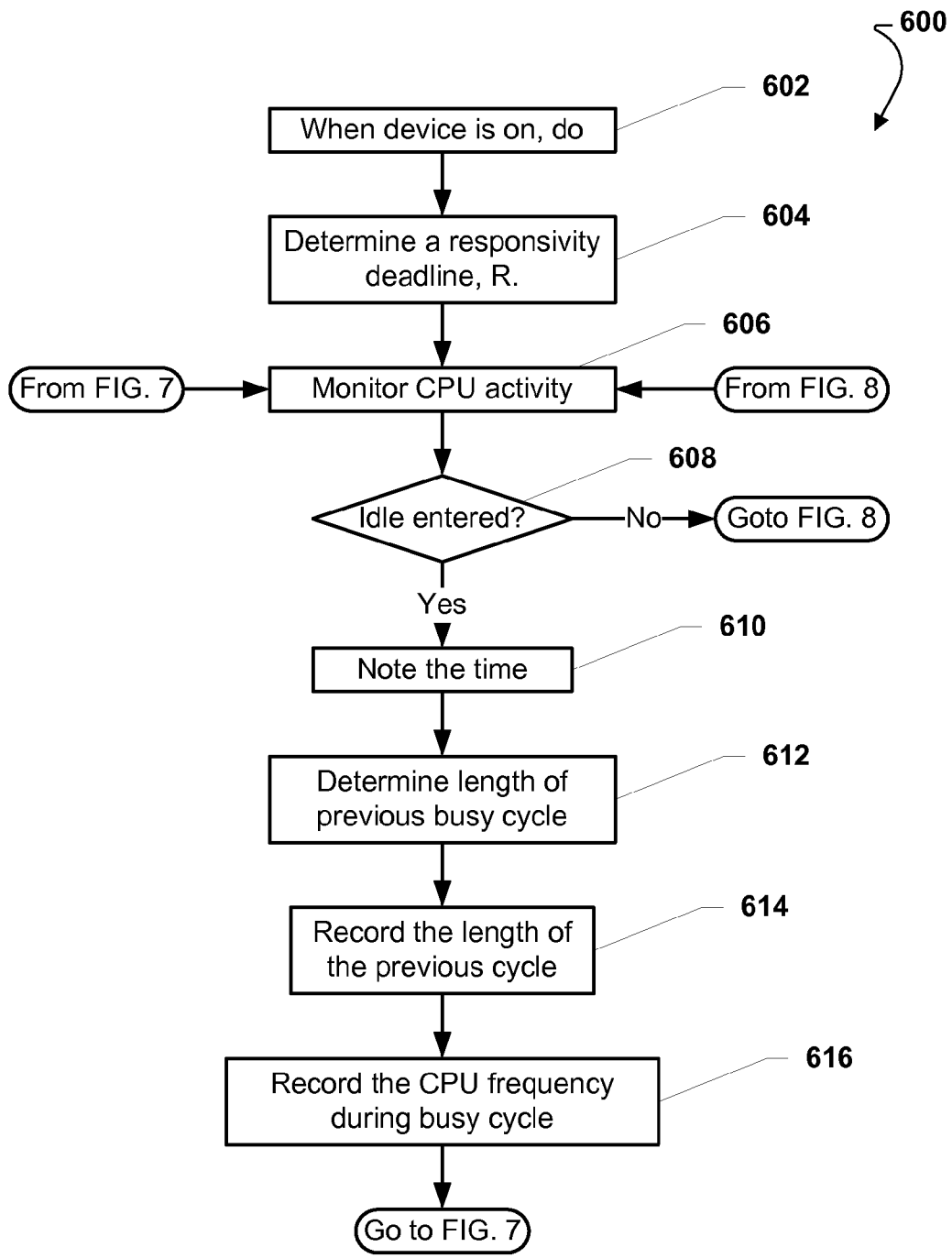
FIG. 6 is a flowchart illustrating a first portion of a second aspect of a method of sampling data within a central processing unit.

Referring to FIG. 6, a second aspect of a method of executing a dynamic clock and voltage scaling (DCVS) algorithm is shown and is generally designated 600. The method 600 begins at block 602 with a do loop in which when a device is powered on, the following steps may be performed. At block 604, a controller may determine a responsivity deadline, R. For example, the responsivity deadline, R, may be set to ninety milliseconds (90 ms).

Moving to block 606, the controller may monitor CPU activity. This activity may be the activity of a single core CPU, a multi-core CPU, multiple single core CPUs, multiple multi-core CPUs, or a combination thereof. Further, the controller may be a software controller, a hardware controller, or a combination thereof.

Moving to decision 608, the controller may determine whether the CPU, or a core of the CPU, has entered an idle state. If the CPU does not enter an idle state, the method 600 may proceed directly to decision 802 of FIG. 8, described below. However, if the CPU enters an idle state, the method 600 may proceed to block 610 and the controller may note the time. Next, at block 612, the controller may determine a length of the previous busy cycle. At block 614, the controller may record the length of the previous cycle. Further, at block 616, the controller may record the CPU frequency, or frequencies, during the busy cycle. Thereafter, the method 600 may proceed to block 702 of FIG. 7. The information collected at block 610 through block 616 may be provided to a DCVS algorithm.

Figure 7:
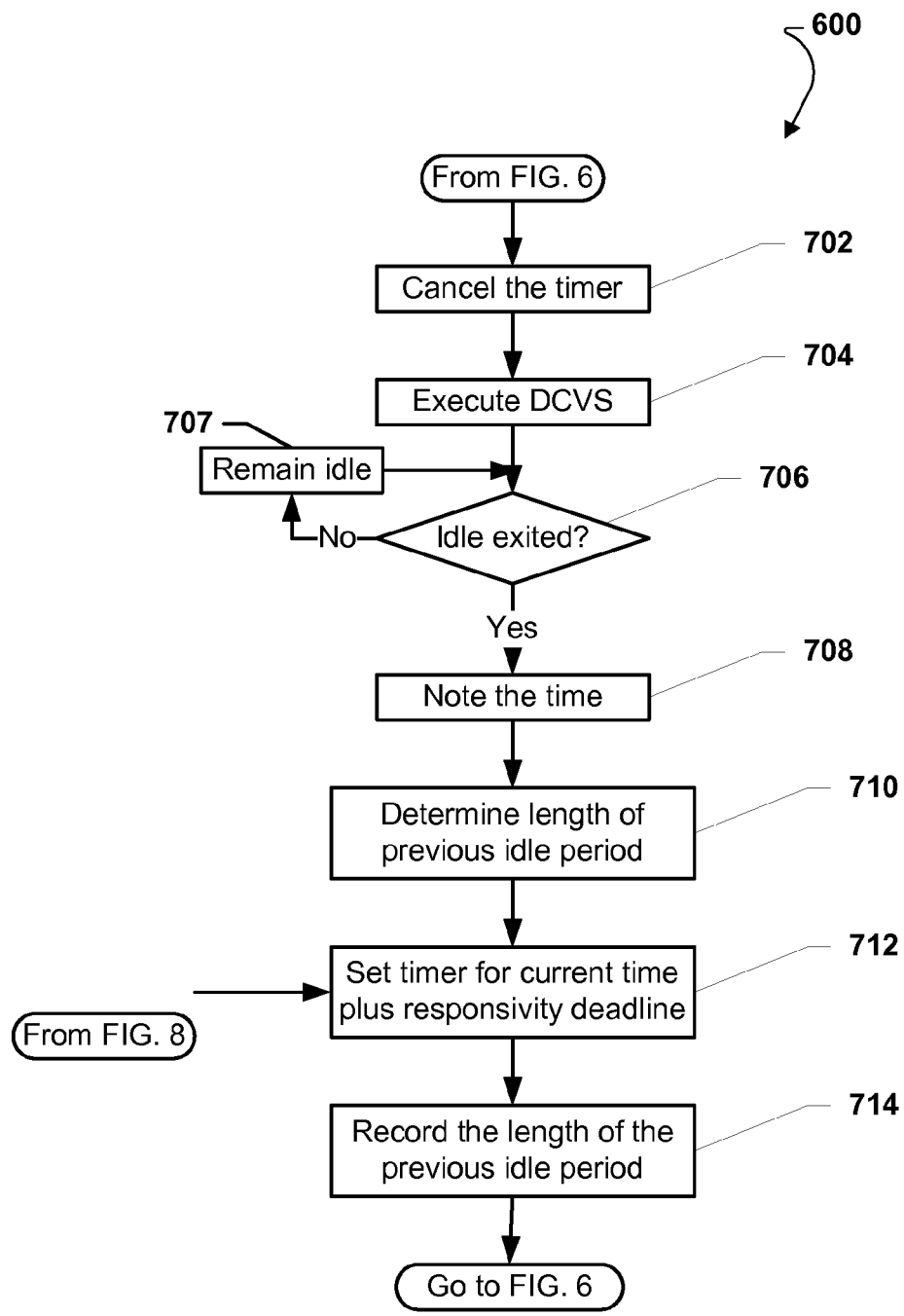
FIG. 7 is a flowchart illustrating a second portion of the second aspect of a method of sampling data within a central processing unit.

At block 702, of FIG. 7, the method 600 may cancel the timer. Moving to block 704, the controller may execute a dynamic clock and voltage scaling (DCVS) algorithm. Next, at decision 706, the controller may determine whether the CPU, or a core of the CPU, as exited the idle state. If not, the method 600 may proceed to block 707 and the CPU may remain idle. Then, the method may return to decision 706 and continue as described herein. If the CPU, or the core thereof, exits the idle state, the method 600 may proceed to block 708. At block 708, the controller may note the time. At block 710, the controller may determine the length of the previous idle period, or cycle. Next, at block 712, the controller may set the timer equal to a current time plus the responsivity deadline. At block 714, the controller may record the length of the previous idle period. Thereafter, the method 600 may return to block 606 of FIG. 6 and the method 600 may continue as described herein. The information collected at block 710 through block 714 may be provided to a DCVS algorithm.

Figure 8:
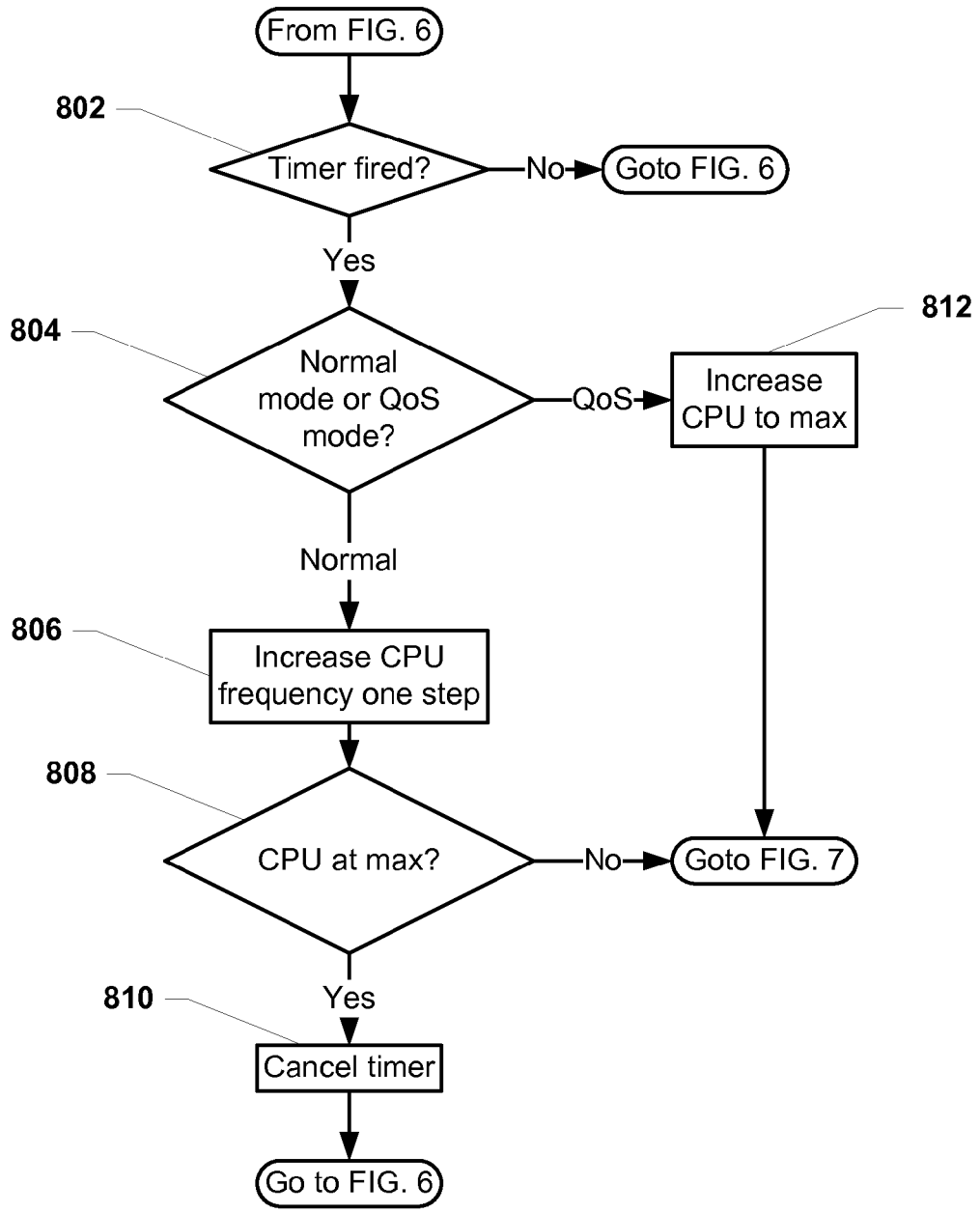
FIG. 8 is a flowchart illustrating a third portion of the second aspect of a method of sampling data within a central processing unit.

Returning to decision 608 of FIG. 6, if the CPU, or the cores therein, do not enter an idle state, the method 600 may proceed to decision 802 of FIG. 8.

At decision 802 of FIG. 8, the controller may determine whether the timer is fired. If not, the method 600 may return to block 606 of FIG. 6 and the method 600 may continue as described herein. On the other hand, at decision 802, if the timer is fired, the method 600 may proceed to decision 804. At decision 804, the controller may determine whether the controller is operating in a normal mode or in a quality of service (QoS) mode. If the controller is operating in a normal mode, the method 600 may proceed to block 806 and the controller may increase the CPU frequency one step.

Next, at decision 808, the controller may determine whether the CPU frequency is at a maximum CPU frequency. If the CPU frequency is at a maximum CPU frequency, the timer may be cancelled at block 810. Then, the method 600 may return to block 606 of FIG. 6. Thereafter, the method 600 may continue as described herein. If the CPU frequency is not at the maximum CPU frequency, the method 600 may return to block 712 of FIG. 7 and the method 600 may continue as described herein.

Returning to decision 804, if the controller is operating in a quality of service mode (QoS), the method 600 may proceed to block 812 and the controller may increase the CPU frequency to the maximum CPU frequency. Then, the method 600 may then return to block 712 of FIG. 7.

Figure 9:
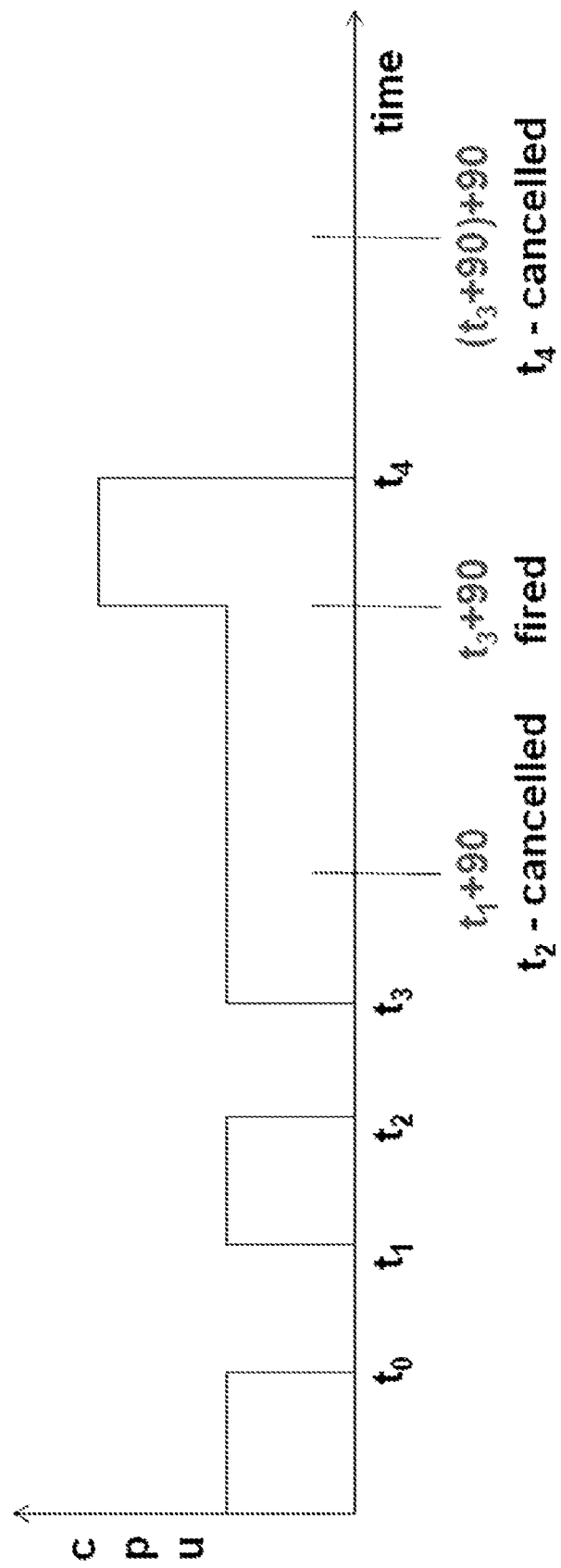
FIG. 9 is a timeline illustrating one operational aspect of a method of sampling data within a central processing unit.

FIG. 9 is a timeline illustrating one operational aspect of a method of sampling data within a central processing unit. In this example, a responsivity deadline may be set equal to ninety milliseconds (90 ms). Beginning at $t_0$, the CPU may enter an idle state. The time may be noted, i.e., the CPU was busy from $t_1$ (not shown) to $t_0$, or ($t_0$–$t_1$). Furthermore, the timer may be canceled. At $t_1$, the CPU may exit, or leave, the idle state. The time may be noted, i.e., the CPU was idle from $t_0$ to $t_1$, or (t1–t0). Next, the timer may be set for $t_1$ plus ninety milliseconds (90 ms).

At $t_2$, the CPU may enter an idle state again. The time may be noted, i.e., the CPU was busy from $t_1$ to $t_2$, or for ($t_2$–$t_1$). Then, the timer may be canceled. At $t_3$ the CPU may exit the idle state. The time may be noted, i.e., the CPU was idle from $t_2$ to $t_3$, or for ($t_3$–$t_2$). Next, the timer may be set for $t_3$ plus 90 ms. At $t_3$ plus 90 ms, the timer fires and the CPU frequency is increased. If the CPU is in a normal mode, the CPU frequency may increase one incremental frequency step. If the CPU is in a QoS condition, the CPU frequency may increase to a maximum CPU frequency. Further, if the CPU frequency is not at the maximum CPU frequency, the timer may be rescheduled for ($t_3$ plus 90 ms) plus 90 ms, i.e., 90 ms from the current time. At $t_4$, the CPU, once again, enters an idle state. The time may be noted, i.e., the CPU was busy from $t_3$ to $t_4$, or for $(t_4-t_3)$, and at a higher rate from $(t_3+90$ ms$)$ to $t_4$. Then, the timer may be canceled.

In a particular aspect, with all the data points collected above, the DCVS algorithm has access to the exact CPU idle times and CPU usage without any interruption of normal processing except for the case at $t_3$ plus 90 ms, and that interruption does minimal work because the decision has been pre-computed at idle time. The DCVS algorithm may also have access to the history of idle/work distribution.

It is to be understood that the method steps described herein need not necessarily be performed in the order as described. Further, words such as "thereafter," "then," "next," etc. are not intended to limit the order of the steps. These words are simply used to guide the reader through the description of the method steps. Moreover, the methods described herein are described as executable on a portable computing device (PCD). The PCD may be a mobile telephone device, a portable digital assistant device, a smartbook computing device, a netbook computing device, a laptop computing device, a desktop computing device, or a combination thereof.

The system and methods described herein provide a sampling method that may be sample-rate independent. Moreover, responsivity, quality of service (QoS), or a combination thereof may be first-class input parameters. Further, the DCVS algorithm processing doesn't interrupt real work and the overhead may move to zero when system is fully loaded. Additionally, clock changes may piggyback on exiting power collapse.

In a particular aspect, with the configuration described herein, the sampling of data may be considered opportunistic. This opportunistic sampling method does not sample the CPU load/idle time at fixed intervals. Instead the opportunistic sampling method directly measures CPU idle by noting when the CPU enters and leaves the idle state. This eliminates the interrupt/context switch overhead associated with periodic sampling. The DCVS algorithm may then runs at idle time when the system is otherwise quiescent, which means that the DCVS algorithm does not interfere with any useful work, and the DCVS algorithm overhead is independent of desired DCVS responsivity.

In general, the present method may save an interrupt and two (2) context switches per sample. Additionally, this may allow CPU clock frequency changes to be scheduled around exiting idle when there is often a clock change necessary.

In a particular aspect, if the CPU were to become fully subscribed, i.e., become one hundred percent (100%), there would be no idle time. With no idle time, there is no opportunity for a sample to be taken and for the DCVS algorithm to run. To avoid this starvation issue, a timeout callback is registered at the worst case busy time for the DCVS algorithm. If the CPU does not go idle before that timeout expires, the system may change clock frequency. This timeout provides a bound on performance even in the presence of a DCVS algorithm. The clock frequency change could include a normal increase in clock frequency or a larger change (up to maximum) to provide any QoS guarantee that maybe required.

In either case, the overhead is minimized, because in this fully subscribed condition there is no need to sample idle data or run the DCVS algorithm, i.e., the decision logic is precomputed. Once the CPU reaches max frequency, the timeout can be cancelled as the system is in the terminal state. Because of this, the present system and method may scale well under load. If the system gets highly loaded, the DCVS algorithm overhead will go to zero. This property may be independent of any desired DCVS responsivity/sensitivity. Further, the present system and method supports arbitrary DCVS algorithms.

In one or more exemplary aspects, the functions described may be implemented in hardware, software, firmware, or any combination thereof. If implemented in software, the functions may be stored as one or more instructions or code on a computer program product such as a machine readable medium, i.e., a non-transitory computer-readable medium. Computer-readable media includes computer storage media that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method of sampling data within a central processing unit (CPU), the method comprising:
    monitoring CPU activity;
    determining whether the CPU entered an idle state;
    executing a dynamic clock and voltage switching (DCVS) algorithm in response to determining that the CPU entered the idle state;
    determining whether a timer has reached a responsivity deadline in response to determining that the CPU did not enter the idle state;
    increasing the CPU frequency in response to determining that the responsivity deadline was reached, wherein increasing the CPU frequency comprises:
        determining whether the CPU is operating in a normal mode or in a quality of service mode; and
        determining an amount by which to increase the CPU frequency based on whether the CPU is operating in the normal mode or in the quality of service mode;
    determining whether the CPU exited the idle state; and
    ceasing execution of the DCVS algorithm in response to determining that the CPU exited the idle state.

2. The method of claim 1, further comprising:
    continuing to execute the DCVS algorithm in response to determining that the CPU did not exit the idle state.

3. The method of claim 1, further comprising:
    recording a current time in response to determining that the CPU entered the idle state;
    determining a length of a previous busy cycle based on the recorded current time; and
    recording the length of the previous busy cycle.

4. The method of claim 1, further comprising:
    recording a current time in response to determining that the CPU exited the idle state;
    determining a length of a previous idle period based on the recorded current time; and
    recording the length of the previous idle period.

5. The method of claim 1, wherein the increasing the CPU frequency in response to determining that the responsivity deadline was reached comprises:
   increasing the CPU frequency to a maximum CPU frequency value when the CPU is operating in a quality of service mode; and
   cancelling the timer.

6. The method of claim 1, wherein the increasing the CPU frequency in response to determining that the responsivity deadline was reached comprises:
   increasing the CPU frequency one incremental step when the CPU is operating in a normal mode; and
   cancelling the timer.

7. The method of claim 6, further comprising:
   determining whether the CPU frequency is equal to a maximum CPU frequency value; and
   cancelling the timer in response to determining that the CPU frequency is equal to the maximum CPU frequency value.

8. A wireless device, comprising:
   means for monitoring a central processing unit (CPU) activity;
   means for determining whether the CPU entered an idle state;
   means for executing a dynamic clock and voltage switching (DCVS) algorithm in response to determining that the CPU entered the idle state;
   means for determining whether a timer has reached a responsivity deadline in response to determining that the CPU did not enter the idle state;
   means for increasing the CPU frequency in response to determining that the responsivity deadline was reached, wherein the means for increasing the CPU frequency comprises:
      means for determining whether the CPU is operating in a normal mode or in a quality of service mode; and
      means for determining an amount by which to increase the CPU frequency based on whether the CPU is operating in the normal mode or in the quality of service mode;
   means for determining whether the CPU exited the idle state; and
   means for ceasing execution of the DCVS algorithm in response to determining that the CPU exited the idle state.

9. The wireless device of claim 8, further comprising:
   means for continuing to execute the DCVS algorithm in response to determining that the CPU did not exit the idle state.

10. The wireless device of claim 8, further comprising:
    means for recording a current time in response to determining that the CPU entered the idle state;
    means for determining a length of a previous busy cycle based on the recorded current time; and
    means for recording the length of the previous busy cycle.

11. The wireless device of claim 8, further comprising:
    means for recording a current time in response to determining that the CPU exited the idle state;
    determining a length of a previous idle period based on the recorded current time; and
    means for recording the length of the previous idle period.

12. The wireless device of claim 8, wherein means for increasing the CPU frequency in response to determining that the responsivity deadline was reached further comprises:
    means for increasing the CPU frequency to a maximum CPU frequency value when the CPU is operating in a quality of service mode; and
    means for cancelling the timer.

13. The wireless device of claim 8, wherein means for increasing the CPU frequency in response to determining that the responsivity deadline was reached further comprises:
    means for increasing the CPU frequency one incremental step when the CPU is operating in a normal mode; and
    means for cancelling the timer.

14. The wireless device of claim 13, further comprising:
    means for determining whether the CPU frequency is equal to a maximum CPU frequency value; and
    means for cancelling the timer if the CPU frequency is equal to the maximum CPU frequency value.

15. A wireless device, comprising:
    a processor, wherein the processor is operable to:
       monitor a central processing unit (CPU) activity;
       determine whether the CPU entered an idle state;
       execute a dynamic clock and voltage switching (DCVS) algorithm in response to determining that the CPU entered the idle state;
       determine whether a timer has reached a responsivity deadline in response to determining that the CPU did not enter the idle state;
       increase the CPU frequency in response to determining that the responsivity deadline was reached by:
          determining whether the CPU is operating in a normal mode or in a quality of service mode; and
          determining an amount by which to increase the CPU frequency based on whether the CPU is operating in the normal or in the quality of service mode;
       determine whether the CPU exited the idle state; and
       cease execution of the DCVS algorithm in response to determining that the CPU exited the idle state.

16. The wireless device of claim 15, wherein the processor is further operable to:
    continue to execute the DCVS algorithm in response to determining that the CPU did not exit the idle state.

17. The wireless device of claim 15, wherein the processor is further operable to:
    record a current time in response to determining that the CPU entered the idle state;
    determine a length of a previous busy cycle based on the recorded current time; and
    record the length of the previous busy cycle.

18. The wireless device of claim 15, wherein the processor is further operable to:
    record a current time in response to determining that the CPU exited the idle state;
    determine a length of a previous idle period based on the recorded current time; and
    record the length of the previous idle period.

19. The wireless device of claim 15, wherein the processor operable to increase the CPU frequency in response to determining that the responsivity deadline was reached comprises a processor further operable to:
    increase the CPU frequency to a maximum CPU frequency value when the CPU is operating in a quality of service mode; and
    cancel the timer.

20. The wireless device of claim 15, wherein the processor operable to increase the CPU frequency in response to determining that the responsivity deadline was reached comprises a processor further operable to:
    increase the CPU frequency one incremental step when the CPU is operating in a normal mode; and
    cancel the timer.

21. The wireless device of claim 20, wherein the processor is further operable to:
- determine whether the CPU frequency is equal to a maximum CPU frequency value; and
- cancel the timer in response to determining that the CPU frequency is equal to the maximum CPU frequency value.

22. A non-transitory computer-readable storage medium having stored thereon processor-executable instructions configured to cause a processor to perform operations for sampling data within a central processing unit (CPU), comprising:
- monitoring the CPU activity;
- determining whether the CPU entered an idle state;
- executing a dynamic clock and voltage switching (DCVS) algorithm in response to determining that the CPU entered the idle state;
- determining whether a timer has reached a responsivity deadline in response to determining that the CPU did not enter the idle state;
- increasing the CPU frequency in response to determining that the responsivity deadline was reached, wherein increasing the CPU frequency comprises:
  - determining whether the CPU is operating in a normal mode or in a quality of service mode; and
  - determining an amount by which to increase the CPU frequency based on whether the CPU is operating in the normal mode or in the quality of service mode;
- determining whether the CPU exited the idle state; and
- ceasing execution of the DCVS algorithm in response to determining that the CPU exited the idle state.

23. The non-transitory computer-readable storage medium of claim 22, wherein the stored processor-executable instructions are configured to cause the processor to perform operations for sampling data within the CPU further comprising:
- continuing to execute the DCVS algorithm in response to determining that the CPU did not exit the idle state.

24. The non-transitory computer-readable storage medium of claim 22, wherein the stored processor-executable instructions are configured to cause the processor to perform operations for sampling data within the CPU further comprising:
- recording a current time in response to determining that the CPU entered the idle state;
- determining a length of a previous busy cycle based on the recorded current time; and
- recording the length of the previous busy cycle.

25. The non-transitory computer-readable storage medium of claim 22, wherein the stored processor-executable instructions are configured to cause the processor to perform operations for sampling data within the CPU further comprising:
- recording a current time in response to determining that the CPU exited the idle state;
- determining a length of a previous idle period based on the recorded current time; and
- for recording the length of the previous idle period.

26. The non-transitory computer-readable medium of claim 22, wherein the stored processor-executable instructions are configured to cause the processor to perform operations for sampling data within the CPU further comprising:
- increasing the CPU frequency to a maximum CPU frequency value when the CPU is operating in a quality of service mode; and
- cancelling the timer.

27. The non-transitory computer-readable medium of claim 22, wherein the stored processor-executable instructions are configured to cause the processor to perform operations for sampling data within the CPU further comprising:
- increasing the CPU frequency one incremental step when the CPU is operating in a normal mode; and
- cancelling the timer.

28. The non-transitory computer-readable medium of claim 27, wherein the stored processor-executable instructions are configured to cause the processor to perform operations for sampling data within the CPU further comprising:
- determining whether the CPU frequency is equal to a maximum CPU frequency value; and
- cancelling the timer in response to determining that the CPU frequency is equal to the maximum CPU frequency value.

* * * * *